US012381824B2

(12) United States Patent
Kleiman et al.

(10) Patent No.: US 12,381,824 B2
(45) Date of Patent: Aug. 5, 2025

(54) LOAD BALANCING AMONG OUTPUT PORTS

(71) Applicant: Intel Corporation, Santa Clara, CA (US)

(72) Inventors: Boris Kleiman, Rishon LeZion (IL); Marina Popilov, Herzlia (IL); Anjali Singhai Jain, Portland, OR (US); Piotr Uminski, Gdynia (PL); Elazar Cohen, Haifa (IL); Kirill Kazatsker, Portland, OR (US); Sarig Livne, Schanya (IL); Neerav Parikh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 17/359,539

(22) Filed: Jun. 26, 2021

(65) Prior Publication Data

US 2021/0328929 A1    Oct. 21, 2021

(51) Int. Cl.
*H04L 47/125* (2022.01)
*H04L 47/21* (2022.01)
*H04L 47/62* (2022.01)
*H04L 47/762* (2022.01)
*H04L 47/78* (2022.01)

(52) U.S. Cl.
CPC ............ *H04L 47/125* (2013.01); *H04L 47/21* (2013.01); *H04L 47/6225* (2013.01); *H04L 47/762* (2013.01); *H04L 47/781* (2013.01)

(58) Field of Classification Search
CPC ... H04L 47/125; H04L 47/21; H04L 47/6225; H04L 47/762; H04L 47/781
See application file for complete search history.

(56) References Cited

U.S. PATENT DOCUMENTS 6,996,099 B1 * 2/2006 Kadambi .............. H04L 47/125
370/389
10,355,981 B1 * 7/2019 Matthews ............... H04L 45/22
(Continued)

OTHER PUBLICATIONS

"Understanding CoS Virtual Output Queues (VOQs) on QFX10000 Switches", Traffic Management User Guide, Juniper Networks TechLibrary, https://www.juniper.net/documentation/us/en/software/junos/traffic-mgmt-qfx/topics/concept/cos-qfx-series-voq-understanding.html, Feb. 9, 2021, 7 pages.
(Continued)

*Primary Examiner* — Charles C Jiang
*Assistant Examiner* — Rachel Elizabeth Marks
(74) *Attorney, Agent, or Firm* — Compass IP Law PC

(57) ABSTRACT

Examples described herein relate to a network interface device that includes packet processing circuitry to detect usage of an egress port and report the usage of the egress port to a network interface device driver to cause reallocation of hash-based packet buckets to at least one egress port to provide an allocation of hash-based packet buckets to multiple active egress ports of the network interface device with retention of bucket-to-egress port mappings except for re-allocations of one or more buckets to one or more active egress ports. In some examples, usage of the egress port is based on a count of hash buckets assigned to packets to be transmitted from the egress port or a number of bytes of packets enqueued to be transmitted from the egress port.

21 Claims, 8 Drawing Sheets

(56) References Cited

U.S. PATENT DOCUMENTS

2003/0016628 A1* 1/2003 Kadambi ............ H04L 47/6215
370/235
2013/0258838 A1* 10/2013 Colven ................. H04L 49/552
370/390

OTHER PUBLICATIONS

Cheng, Wenxue, et al., "Re-architecting Congestion Management in Lossless Ethernet", NNS group @ Department of Computer Science and Technology, Tsinghua University, Feb. 17, 2020, 38 pages.

* cited by examiner

LOAD BALANCING AMONG OUTPUT PORTS

BACKGROUND

A key performance indicator (KPI) for aggregated output deployments such as layer 2 (L2) Link Aggregation Group (LAG) or layer 3 (L3) Equal Cost Multipath (ECMP) is to provide equal utilization of output ports. Unfair distribution of ports can be due to specific output port conditions such as flow control congested, re-negotiated reduced speed down, and so forth. Packet-to-flow affinity-based balancing can introduce unknown and variable packet size, variable throughput, bursts, and variable duration characteristics of flows so that fair allocation to ports based on of packet header tuple-based hash-calculated buckets or flows can be difficult to achieve. When working in LAG or ECMP models, egress traffic flows can be sent to different physical ports participating in a group, while a decision about a destination port is made by a transmit hash function. When hash function results have insufficient entropy of distribution, or traffic workload becomes high on one of the ports and it exceeds its bandwidth, or head-of-line blocking happens because one of the ports is slow, packets can become dropped or flow control can be initiated. Multiple-input-multiple-output (MIMO) switching fabric design can be subject to a head-of-line blocking constraint where an output resource (e.g., port) is chosen to forward the traffic from multiple queues simultaneously, preventing other outputs to be used.

FIG. 1 demonstrates an allocation of packets to flows and flows to workloads. In a system using load balancing based on hashing, throughput of flow (e.g., elephant or mouse) is not known based on hash of n-tuple and a flow can be kept in a same link. An elephant flow can be a longer running flow that occupies a larger amount of network bandwidth whereas a mouse flow can be a flow that occupies a relatively smaller amount of network bandwidth. As shown, over time, a bandwidth allocated to elephant of mice flows can vary. Some network deployments can use any balancing schemes (round robin (RR), weighted load counting, sticky session, etc.) can be challenged to provide fair (equal) for balanced group members during a runtime workload. A static preventive configuration does not adjust to provide fair allocation of heterogenous traffic among output ports.

DETAILED DESCRIPTION

Figure 1:
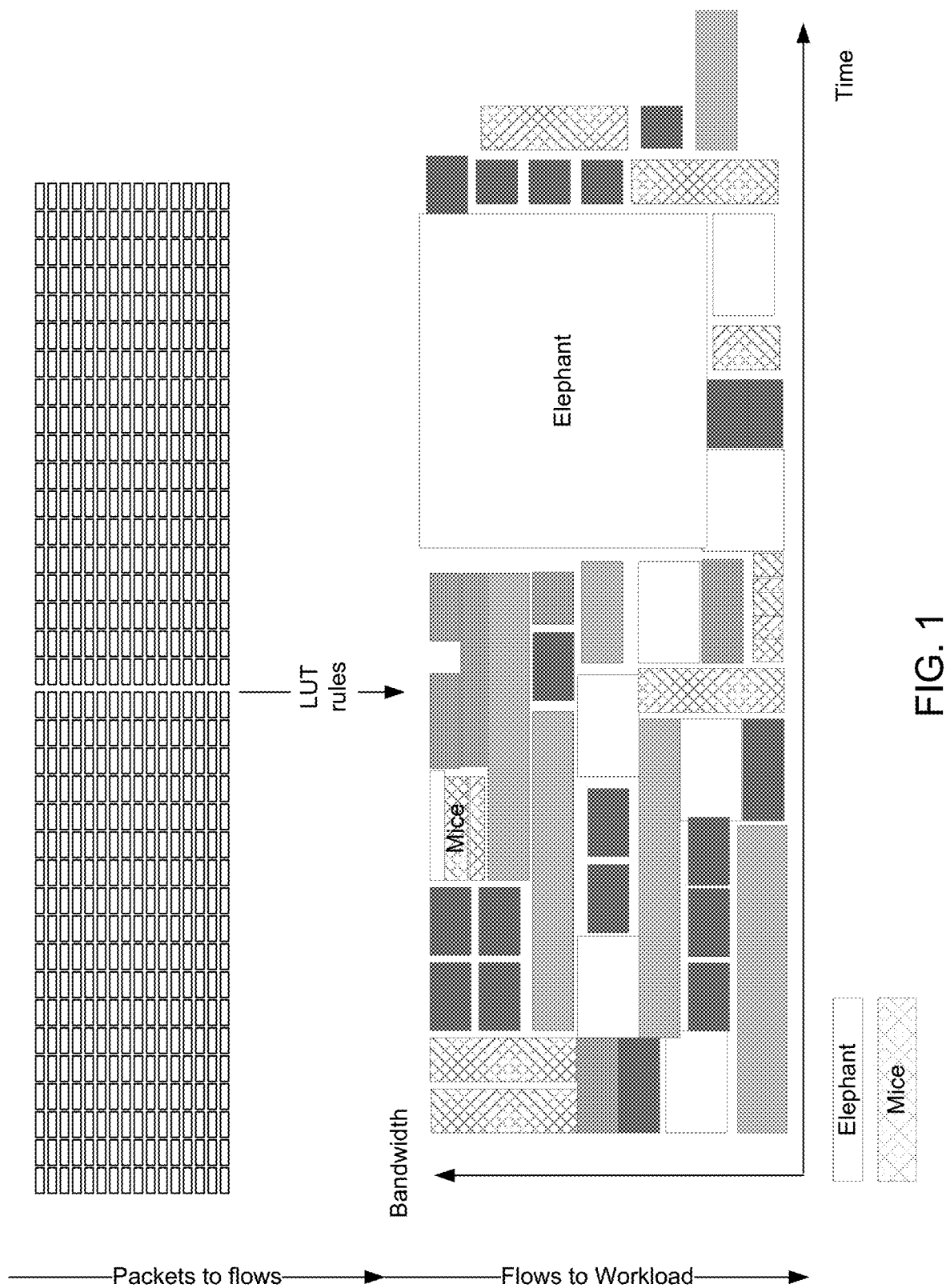
FIG. 1 demonstrates an allocation of packets to flows and flows to workloads.

A host system can offload detection of over allocation or under allocation of hash-based buckets to physical ports to a network interface device. A packet processing pipeline of the network interface device can detect port underrun or port overflow or congestion situations (in addition to existing pause flow control (PFC) detection) and report situations to the host (e.g., driver and/or operating system (OS)). The host system can offload to the network interface device detection of head of line blocking (HOLB)) at one or more egress ports (e.g., <60% of group capability). For example, over allocation of hash-based buckets to physical ports can include allocating a threshold level or more number of hash-based buckets to physical ports. For example, under allocation of hash-based buckets to physical ports can include allocating a second threshold level or fewer number of hash-based buckets to physical ports.

As described herein, a system can perform reactive load balancing that autonomously controls outgoing traffic fairness by applying different reshuffling buckets for a chosen load balancing (LB) scheme, rearranging bucket inputs for a chosen LB scheme, and/or applying a different LB scheme, based on monitoring at multiple levels of network device resources utilization (e.g., port, hash buckets, and/or queues) as well as traffic analysis (e.g., packets, flows, or traffic pattern discovery).

The host system can reduce traffic loss or retransmissions. The driver and/or operating system (OS) can rebalance assignments of packet buckets or flows to egress ports by analyzing buckets to an egress port and attempting to balance a number of buckets allocated to an egress port while reducing or minimizing changes to allocations of buckets to ports. A bucket can be determined by a hash calculation on an N-tuple of a packet header, where N is an integer. A tuple can include one or more of source internet protocol (IP) address, source port, destination IP address, destination port, or transport protocol utilized.

Host software (e.g., driver and/or OS) and/or network interface device can manage load balancing tables (LBT) to attempt to provide fair allocation of buckets to output ports. The software and/or network interface device can identify buckets associated with overused or underused ports and reallocate buckets approximately evenly across available output ports. Due to unavailability of a port, host software and/or network interface device can reallocate buckets to available ports while attempting to minimize changes of existing allocations of buckets-to-ports and attempting to provide an approximately even allocation of buckets to ports. Similarly, in response to addition of a port, host software and/or network interface device can reallocate buckets to available ports while attempting to minimize changes of existing allocations of buckets-to-ports and attempting to provide an approximately even allocation of buckets to ports. Changing bucket to port allocation can be a cause of packet drop and reducing a number of bucket-to-port allocations can reduce packet drops caused by changing bucket-to-port allocations.

A network interface device can apply hash-based balancing schemes applied in layer 2 (L2) (e.g., IEEE 802.3ad Link Aggregation Control Protocol (LACP)) and layer 3 (L3) (e.g., ECMP traffic load balancer (TLB) or Adaptive Load Balancing (ALB) with output ports associated with a bucket allocated using host software and/or network interface device.

A network interface device and/or host system can monitor and troubleshoot root causes such as bad choice of balancer key, low entropy hash function, variety of heterogenous flows by throughput, packet size, bursts from different applications, multiple hosts, etc. Changes to hash functions and or keys (e.g., N-tuples) can be made to attempt to provide more equal bucket-to-port allocations. A hash function can map arbitrary sized data to fixed-size values so that in some cases, different values that are subject to a same hash function can result in a same output value.

Changing allocation of a hash-based bucket to another egress port can cause packet transmission reordering. Some examples can be used to transmit packets in a particular sequence order or reorder packets sent using resilient or reliable transport scheme (e.g., Transmission Control Protocol (TCP)) to present packets to a host in a received packet sequence order.

Figure 2A:
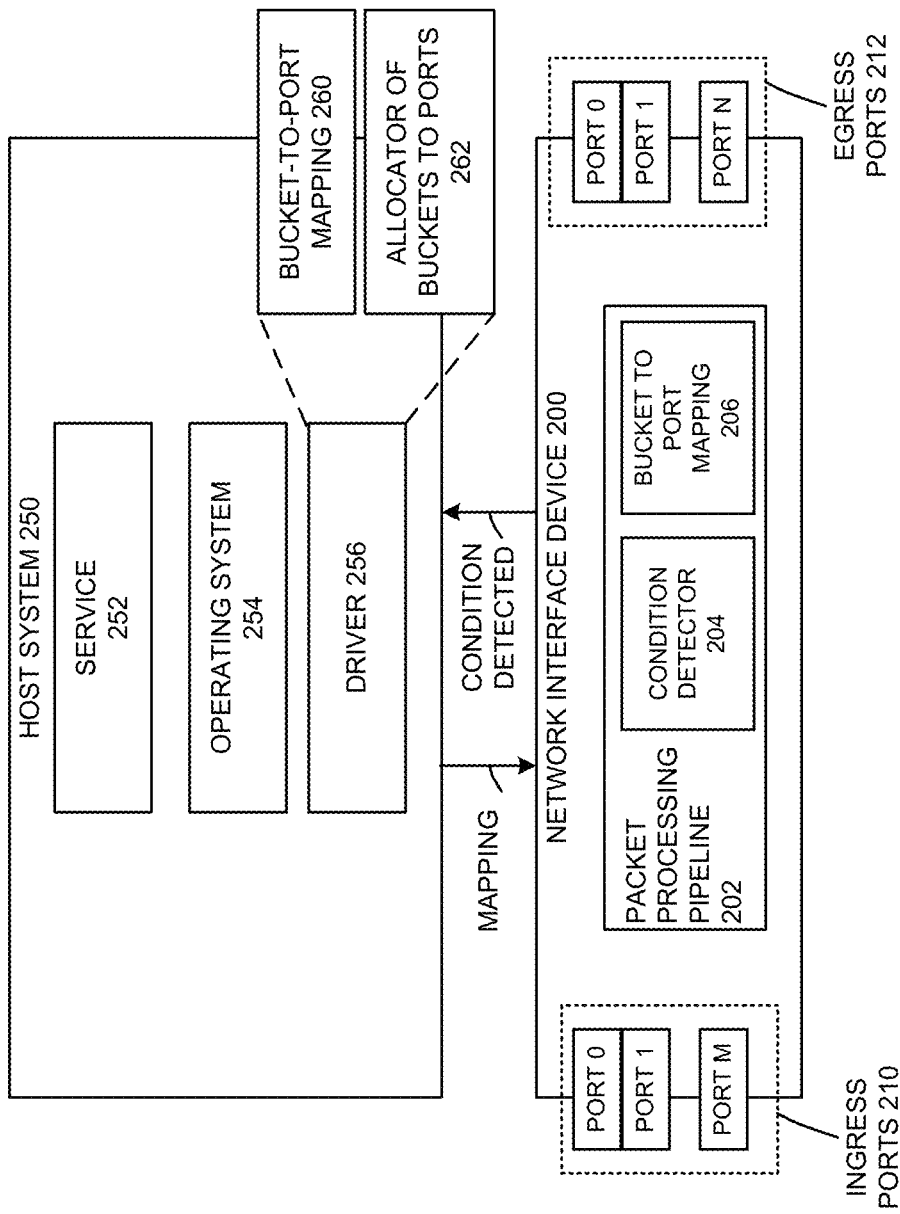
FIG. 2A depicts an example system.

FIG. 2A depicts an example system. Network interface device 200 can be implemented or perform operations of one or more of: network interface controller (NIC), SmartNIC, router, switch, forwarding element, infrastructure processing unit (IPU), or data processing unit (DPU). Network interface device 200 can monitor traffic load per port. Packet processing pipeline 202 of network interface device 200 can be configured to detect egress port underflow or overflow. Packet processing pipeline 202 can use per-port packet occupancy counters (not shown) to determine packets stored for egress to identify egress port underflow or overflow. As described herein, in some examples, counters can be compared to preconfigured set of watermarks and thresholds to identify potential overflow or underflow, and inform driver 256 of host system 250 of a detected overflow or underflow condition or state and the particular egress port that is experiencing overflow or underflow. Packet processing pipeline 202 of network interface device 200 and/or driver 256 can attempt to alleviate overflow by issuing a priority flow control (PFC) signal to a sender of packets to the queue associated with the overflowed port. Counters can monitor traffic load per egress port among egress ports 212 or set of egress ports among egress ports 212 and traffic class (TC) and can be configured by firmware at runtime according to actual egress port speed. Packet processing pipeline 202 can notify driver 256 of changes to conditions of egress ports such as reporting that an egress port that was formerly overflowing or underflowing is not overflowing or underflowing.

Driver 256 can provide an interface between service 252 and/or operating system 254 with network interface device 200. In some examples, driver 256 can be implemented as part of operating system 254. Note that reference to microservice, application, function, process, routine, or service can be used interchangeably such that reference to one can refer to one or more of a microservice, application, function, process, routine, or service. Driver 256 can identify an overflow state for an egress port based on an indicator from packet processing pipeline 202. Driver 256 can allocate or reallocate buckets to egress ports in a manner to provide approximately equal allocation of buckets to available egress ports. For example, based on an egress port being identified as congested or overflowed, driver 256 can allocate buckets to other egress ports that are not identified as congested or overflowed. In some examples, bucket-to-port mapping 260 can represent a bucket to egress port mapping. In some examples, an array of buckets to port mapping can be a matrix format and determining a number of buckets allocated to a particular port can be performed by applying a mask to a bitmap array. In some examples, summing of number of buckets allocated to an egress port can be performed using summing per column or row. Ports can be assigned per column and an array of buckets can be spread across the columns.

Driver 256 can configure packet processing pipeline 202 to apply bucket-to-port mapping 260 so that a packet that is to be transmitted can be assigned to an egress port queue. The packet that is to be transmitted can be received from another network interface device, so that network interface device 200 performs packet forwarding, or from host system 250.

Figure 2B:
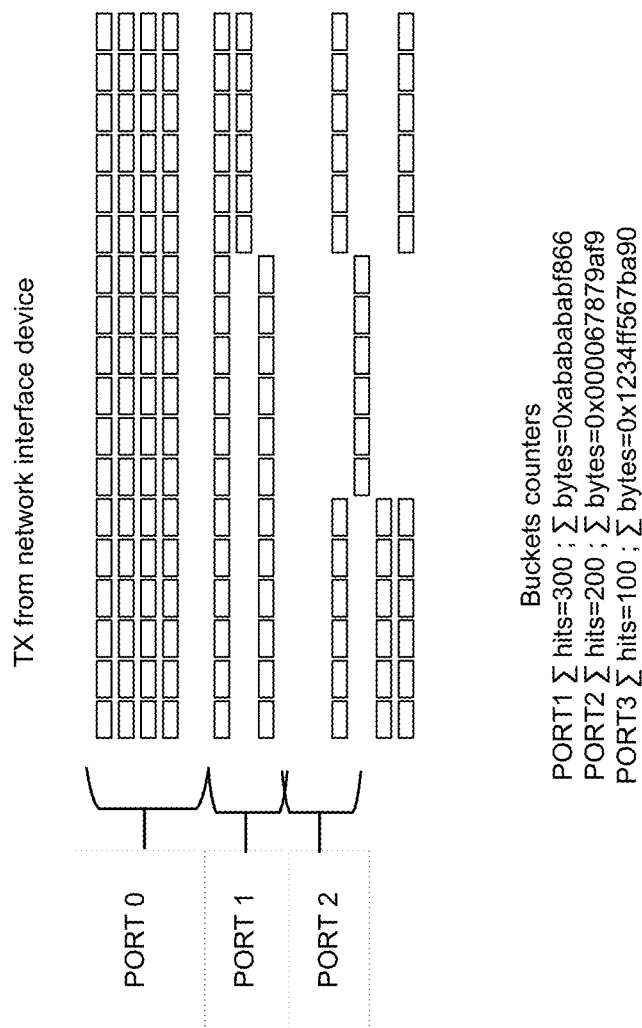
FIG. 2B depicts an example manner of detecting overflow or underrun.

FIG. 2B depicts an example manner of detecting overflow or underrun. A count per port of hash buckets with associated packets assigned to be transmitted from one or more output ports over a time window can be tracked. In some examples, a number of bytes of packets that are enqueued prior to transmit over a time window can be tracked. Overrun or overflow of a port can be determined based on a comparison against a threshold level of the count of hash buckets with associated packets assigned to be transmitted from an egress port or number of bytes of packets enqueued to be transmitted from the egress port. Underrun of an egress port can be determined based on a comparison against a threshold level of the count per port of hash buckets with associated packets assigned to be transmitted from an egress port or number of bytes of packets enqueued to be transmitted from the egress port.

Figure 2C:
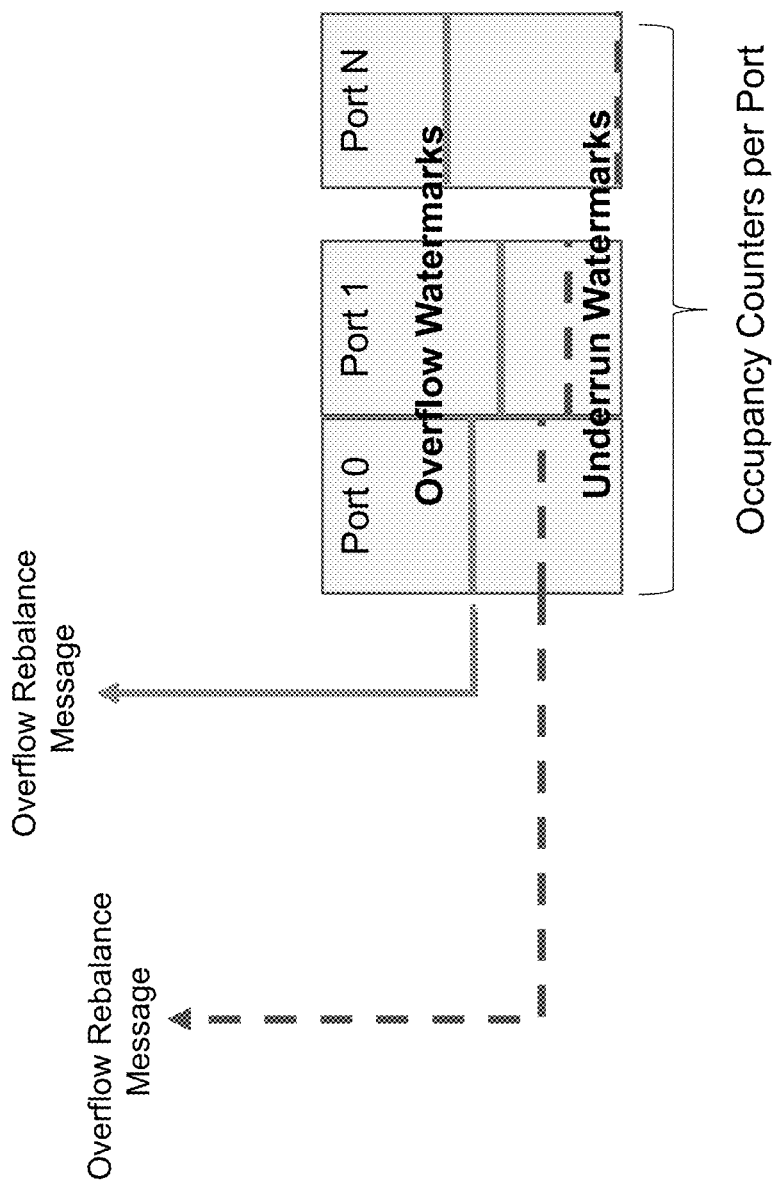
FIG. 2C depicts an example of overflow levels or watermarks and underflow levels or watermarks.

FIG. 2C depicts an example of overflow levels or watermarks and underflow levels or watermarks. Bucket assignment counters can determine a count of a number of buckets with associated packets to be transmitted from egress ports 0 to N and the count can be compared against overflow watermarks and underrun watermarks to determine whether respective overflow or underflow occurred. Firmware and/or a driver can configure overflow and underflow levels according to negotiated link speed. In some cases, an overflow watermark can refer to a per-port packet transmit rate or queue level expected to correspond to head of line blocking condition or congestion. Head of line blocking can refer to a port in a LAG not running fast enough to send its packet to a line and its buffer becomes full. For example, detection of 58% of grouped output throughput utilization can refer to head of line blocking.

Underrun Watermark can be used to detect LAG hash or flows distribution problems when one or more of the egress ports in an LAG does not enough traffic to transmit, because insufficient number of flows are mapped to an egress port or a hash function is not working properly to distribute enough traffic via buckets to the egress port.

If the overflow watermark is exceeded or underrun watermark is passed and stays exceeded or passed, the network interface device 200 can run a timer to monitor how much time a port stays in such overflow or underrun state. At or after expiration of a timer, network interface device 200 can generate overflow or underrun messages (shown as Condition Detected) to driver 256. The messages can be in the form of an interrupt or a write of a value to a particular register or memory address. In response to the message, identified overrun or underrun port, driver 256 can perform re-balancing of buckets to ports, as described herein, to allocate fewer buckets to an overrun port or more buckets to an underrun port. In some examples, network interface device 200 can generate a PFC XOFF for overflow conditions or XON for underflow conditions.

Figure 3:
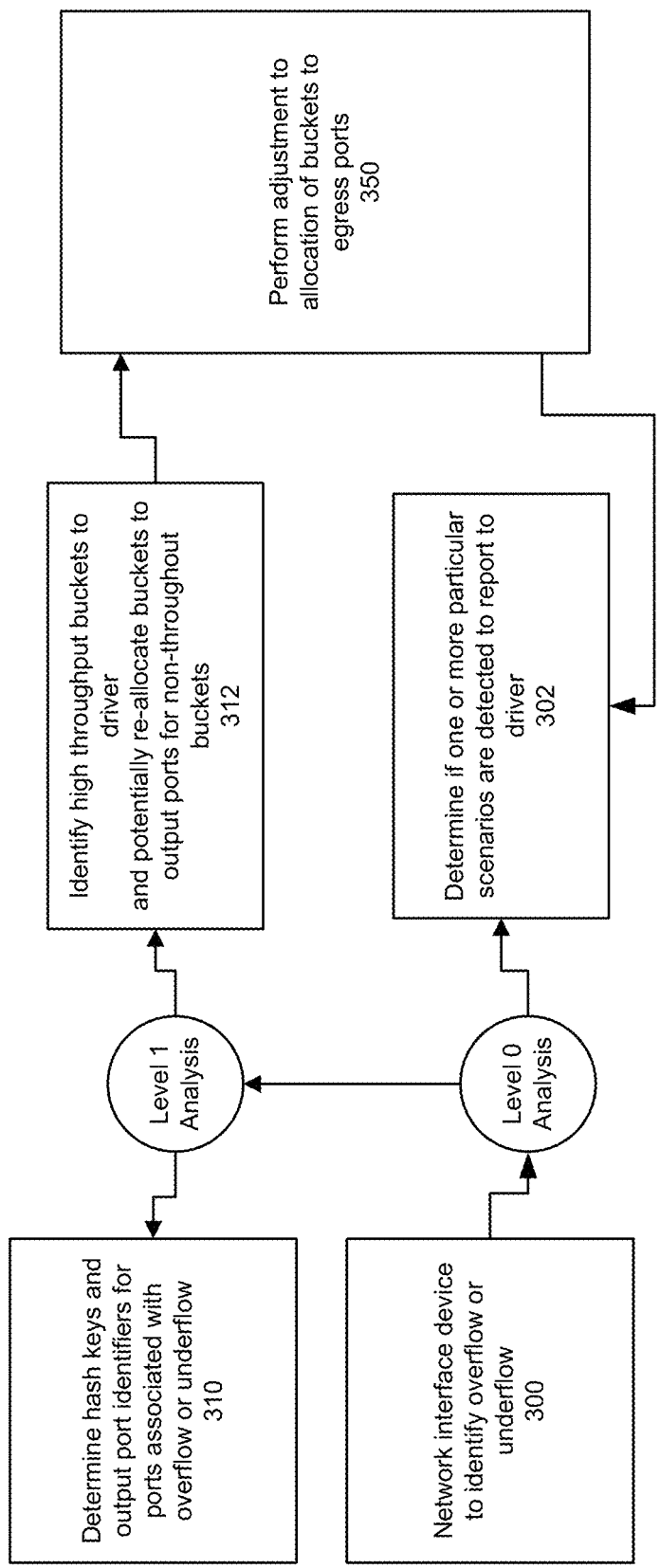
FIG. 3 depicts an example process.

FIG. 3 depicts an example process. Various levels of analysis can be performed. At 300, a network interface device can determine if overflow or underflow of a port has occurred. For example, network interface device can utilize per-egress port bucket or packet counters to determine if high or low watermarks have been passed respectively beyond or below. For example, an average percentage of bucket utilization per port can be determined over a period of time, configured by a driver. If the average percentage of bucket utilization per port over a period of time exceeds the high watermark or is below the low watermark, an alert message can be issued to network interface device firmware and/or a network interface device driver. At 302, the network interface device firmware and/or a network interface device driver can determine if one or more scenarios are detected at the network interface device.

For example, head of line blocking can be identified from 58% bucket utilization of ports of a LAG and if packet drops cause increase in per-egress port bucket or packet counters. Average measurements of bucket utilization can be used to reduce anomalies, identify trends (e.g., gap increase). For example, identification can be made of one or more ports that are utilized a N times less than and N times more than an average utilization in a LAG. For example, the multiple N can be 2 but other values can be used. The network interface device firmware and/or a network interface device driver can report ports that exhibit head of line blocking or higher or lower utilization to the driver.

At 310, hash keys for output port identifiers can be determined for one or more ports associated with underflow or overflow can be determined and provided to the network interface device firmware and/or a network interface device driver.

At 312, the network interface device firmware and/or a network interface device driver can identify high throughput buckets. High throughput buckets can be identified based higher than a threshold number of bytes transmitted over a time period. High throughput buckets can be identified based on a packet counters for the bucket being X times more than an average utilization of an LAG can be determined. In some examples, X is 5 but other values can be used. Hash keys for the high throughput buckets can be reported to the network interface device driver. In some cases, flows or buckets that are not high throughput can be re-shuffled by the network interface device firmware and/or a network interface device driver by associating such flows or buckets with different output ports (PortOutID).

At 350, a network interface device driver can perform corrective actions to attempt to more evenly allocate buckets to output ports. For example, for buckets that are underutilized, a hash key may be adjusted by using a same hash algorithm and fields to hash and setting underutilized output port in frequently utilized packet buckets but not associating such underutilized output port in underutilized buckets and permitting re-shuffling of buckets to include such underutilized output port. The process can return to 300.

If using the same hash algorithm and fields to hash and re-shuffling does not result in the bucket being more evenly utilized, then one or more of the following can take place at some time increments afterwards: shift right digest hash key to improve entropy and allow re-shuffling of all bucket-to-port allocations; changing fields to be hashed and allow re-shuffling of all bucket-to-port allocations; change hash function; or change to round robin selection.

Figure 4A:
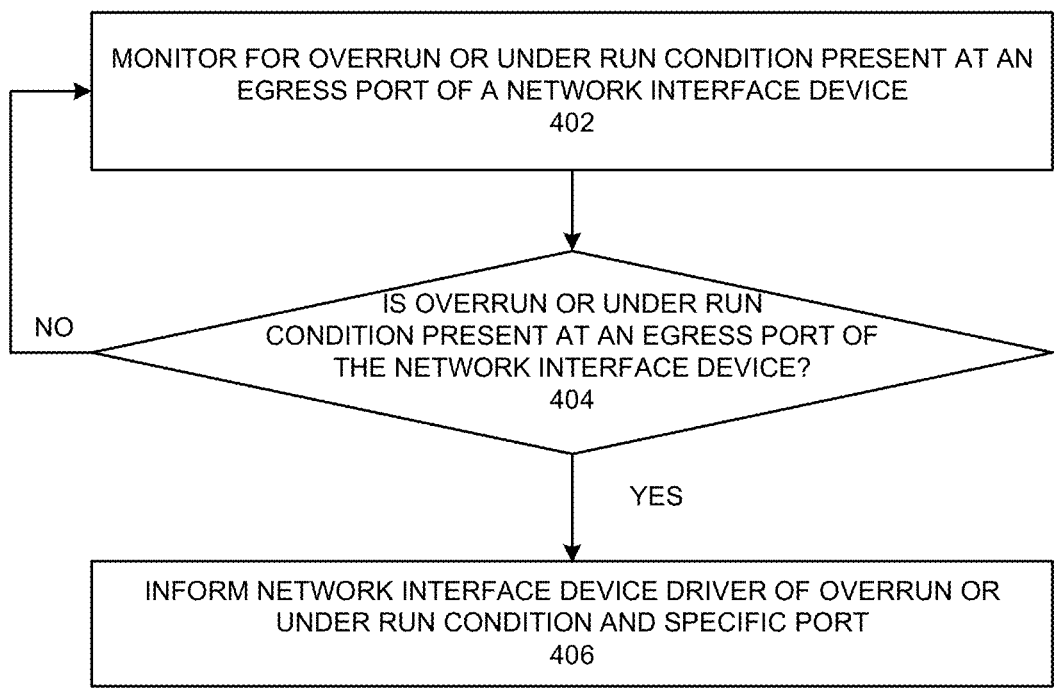
FIG. 4A depicts an example process to determine whether to request reallocation of buckets to ports.

FIG. 4A depicts an example process to determine whether to request reallocation of buckets to ports. At 402, a network interface device can determine if a count of packets to be transmitted from an egress port or a number of buckets allocated to an egress port, over a time period, exceeds a threshold or is below a second threshold.

At 404, if count of packets to be transmitted from an egress port or a number of buckets allocated to an egress port, over a time period, exceeds a threshold or is below a second threshold, at 406, the network interface device can inform the network interface device driver of overrun or underrun and the specific port. Note homogenic overrun or underrun situations when all ports altogether get to over or under load can be treated on exactly same way as proposed on per port basis, but assigning separate set of occupancy and watermarks per group. Note that the driver can disable one of the hardware offload detection mechanisms by disabling an interrupt indication or by configuring overflow watermark to max buffer capacity and LAG underrun watermark to 0.

Figure 4B:
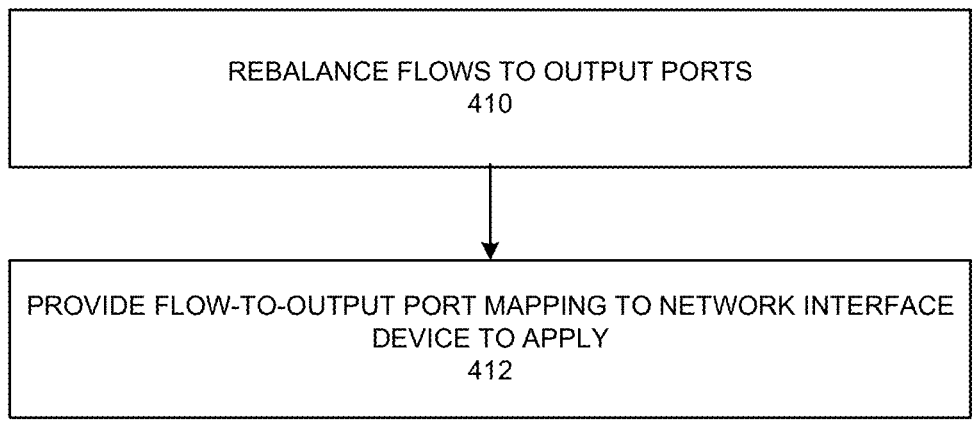
FIG. 4B depicts an example process to reallocate buckets to ports.

FIG. 4B depicts an example process to reallocate buckets to ports. At 402, network interface device driver can rebalance flows by reading and analyzing rebalance bucket counters. Rebalancing buckets to port assignment can occur for (a) port loss by assigning ports to buckets to provide approximately even distribution of buckets to ports or (b) port addition to assign ports to buckets to reduce a number of changes of bucket to port assignment. In some cases, changes to bucket to port assignment could cause packet drop.

An example manner of reassigning buckets to ports can be as follows. Subscribe $P_{ACT}$ members to $\|LBT\|$ slots fairly, so number of subscriptions for each member $N_i^{P_{ACT}}$ satisfies criteria:

$$N_i^{P_{ACT}} = \begin{cases} \text{ceil}\left(\frac{\|LBT\| - Idx_{L^{ACT}}(mbr_i)}{P_{ACT}}\right), & mbr_i \in L^{ACT} \\ 0, & mbr_i \notin L^{ACT} \end{cases} \quad (1)$$

$$i = \overline{0, P_{TOT} - 1}, mbr_i \in L^{TOT}$$

after each member subscribe/unsubscribe operation with a minimum number of changes of bucket to port assignments.

An example manner of allocating buckets to output ports can be as follows. Exemplary, non-limiting definitions of terms are provided first.

$\|A\|$—number of elements in A ceil(A)—ceiling function of A $A_i$—$i^{th}$ element of A, if not explicitly mentioned something else $L^{TOT}$—ordered list of all members of the group $P_{TOT}$—total number of all members of the group, equals to $\|L^{TOT}\|$ $L^{ACT}$—ordered list of currently active members, $L^{ACT} \subset L^{TOT}$. Members should appear in the same order as in $L^{TOT}$ $P_{ACT}$—number of currently active members, equals to $\|L^{ACT}\|$, $P_{ACT} \leq P_{TOT}$ $Idx_A(B)$—index of B in A $A_{mod\ B}$—remainder of division A by B A network device can subscribe $P_{ACT}$ members to $\|LBT\|$ slots fairly, so number of subscriptions for each member $N_i^{P_{ACT}}$ satisfies criteria:

$$N_i^{P_{ACT}} = \begin{cases} \text{ceil}\left(\frac{\|GLBT\| - Idx_{L^{ACT}}(mbr_i)}{P_{ACT}}\right), & mbr_i \in L^{ACT} \\ 0, & mbr_i \notin L^{ACT} \end{cases} \quad (1)$$

$$i = \overline{0, P_{TOT} - 1}, mbr_i \in L^{TOT}$$

after each member subscribe/unsubscribe operation with minimal LBT changes to reduce packet drops caused by changes to bucket-to-port assignments. A group member can have its own fixed placement in LBT. When a member (port) goes inactive, its slots can be distributed between active members on a fair basis. When a member (port) becomes active, slots can be restored from active or inactive members.

A distribution vector can be a vector of size $P_{TOT}$, containing $N_i^{P_{ACT}}$ values, which should be updated after any operation:

$$DV = \{N_i^{P_{ACT}}\}, i = \overline{0, P_{TOT}-1}$$

LBT can be filled with group members according to the formula:

$$LBT_{i+nP_{TOT}} = mbr_i, \quad (2)$$

where $$i = \overline{0, P_{TOT}-1}, n = \overline{0, N_i^{P_{TOT}}-1}.$$

Later, $LBT_i^n$ instead of $LBT_{i+nP_{TOT}}$ is used.
Note that (2) is equivalent to $$LBT_i = mbr_{i \mod P_{TOT}}, \text{ where } i = \overline{0, \|LBT\|-1}, \quad (3)$$

which is recommended to use for initialization flow simplification

The DV can be updated assuming $L^{ACT} = L^{TOT}$.

To unsubscribe member A from LBT, all of its subscriptions are replaced with active members by:
1. Remove A from $L^{ACT}$
2. Find an index in $L^{ACT}$, from which we'll start replacement:
   a. First find necessary index in $L^{TOT}$ $$I^{TOT} = \min\left\{i : DV_i = \min_{j:DV_j>0, mbr_j \in L^{ACT}} DV_j\right\}$$

b. Now find it in $L^{ACT}$ $$I^{ACT} = Idx_{L^{ACT}}(L_{I^{TOT}}^{TOT})$$

3. Replace subscriptions of A:
   a. Start form $LBT_{Idx_L^{TOT}(A)}^n = L_i^{ACT}$:

$$i = (I^{ACT}+n)_{\mod P_{ACT}}, n = \overline{0, N_i^{P_{TOT}}-1}$$

Remember next index to be used $$I^{ACT} = (i+n)_{\mod P_{ACT}}$$

b. Now replace it from substitutions $$LBT_i^n = \begin{cases} LBT_i^n, & LBT_i^n \neq A \\ L_j^{ACT}, & LBT_i^n = A \end{cases},$$

where $$i : N_i^{P_{TOT}} = 0,$$

$$j = (I^{ACT}+n)_{\mod P_{ACT}},$$

$$n = \overline{0, N_i^{P_{TOT}}-1}$$

4. Update DV

To subscribe member A, its subscriptions can be restored and several substitutions of currently active subscriptions can occur by:

1. Add A to $L^{ACT}$
2. Count delta table $$\Delta_i = DV_i - N_i^{P_{ACT}}, i = \overline{0, P_{TOT}-1}$$

Note that $$\sum_{i=0}^{P_{TOT}-1} \Delta_i = 0$$

3. Restore $LBT_{Idx_L^{TOT}(A)}^n = (A)$, $$LBT_{Idx_L^{TOT}(A)}^n = (A),$$

making corrections to $\Delta_i$ of substituted members.
For A true $$\Delta_{Idx_L^{TOT}(A)} = \Delta_{Idx_L^{TOT}(A)} + N_{Idx_L^{TOT}(A)}^{P_{TOT}}$$

4. Restore table balance
   Repeat until $\Delta_i > 0$ exists:
      Substitute currently active $mbr_j$ $$LBT_i^n = \begin{cases} LBT_i^n, & LBT_i^n \neq mbr_j \\ A, & LBT_i^n = mbr_j \end{cases},$$

where $$i: mbr_i \notin L^{ACT},$$

$$n = \overline{0, N_i^{P_{TOT}}-1}$$

and make corrections to affected $\Delta_i$

5. Update DV

Replacement of all subscriptions of member A by member B can occur by:
1. A and B should meet condition below:

$$A \in L^{ACT}, B \notin L^{ACT}$$

2. Replace $LBT_{Idx_L^{TOT}(A)}^n$ $$LBT_{Idx_L^{TOT}(A)}^n = B,$$

3. Replace A by B in all relevant slots:

$$LBT_i^n = \begin{cases} LBT_i^n, & LBT_i^n \neq A \\ B, & LBT_i^n = A \end{cases},$$

where $$i: mbr_i \notin L^{ACT},$$

$$n = \overline{0, N_i^{P_{TOT}}-1}$$

4. Replace A by B in $L^{ACT}$
5. Swap A and B in $L^{TOT}$
6. Update DV (swap corresponding values)

An example re-ordering operation is described next. Consider an LBT table with a group of 6 members having member numbers 0, 1, 2, 3, 4, and 5 and corresponding port numbers 0, 1, 2, 3, 5, and 7.

TABLE 1

| Index  | 0 | 1 | 2 | 3 | 4 | 5 |
|--------|---|---|---|---|---|---|
| Member | 0 | 1 | 2 | 3 | 5 | 7 |

The LBT can be initialized as an association of 64 slots or buckets with ports. For example, a table of 11 rows and 6 entries per row, except the last row of 4 entries, can represent an association of 64 slots or buckets with ports.

TABLE 2

| | | | | | | |
|---|---|---|---|---|---|---|
| 0  | 0 | 1 | 2 | 3 | 5 | 7 |
| 6  | 0 | 1 | 2 | 3 | 5 | 7 |
| 12 | 0 | 1 | 2 | 3 | 5 | 7 |
| 18 | 0 | 1 | 2 | 3 | 5 | 7 |
| 24 | 0 | 1 | 2 | 3 | 5 | 7 |
| 30 | 0 | 1 | 2 | 3 | 5 | 7 |
| 36 | 0 | 1 | 2 | 3 | 5 | 7 |
| 42 | 0 | 1 | 2 | 3 | 5 | 7 |
| 48 | 0 | 1 | 2 | 3 | 5 | 7 |
| 54 | 0 | 1 | 2 | 3 | 5 | 7 |
| 60 | 0 | 1 | 2 | 3 | N/A | N/A |

An initial assignment of slots or buckets to ports can be as follows: bucket 0 to port 0, bucket 1 to port 1, bucket 2 to port 2 . . . bucket 30 to port 0, bucket 31 to port 1, bucket 32 to port 2 . . . bucket 60 to port 0 and so forth. A distribution of ports or members to slots or buckets can be as follows.

TABLE 3

| Member | 0 | 1 | 2 | 3 | 5 | 7 |
|---|---|---|---|---|---|---|
| DV | 11 | 11 | 11 | 11 | 10 | 10 |

Assignments of buckets to ports can be made to attempt an even distribution across ports. For example, 11 buckets can be assigned to each of ports 0, 1, 2, and 3 and 10 buckets can be assigned to each of ports 5 and 7.

A situation can arise where a port number 2 is congested, inactive, or disabled. Buckets assigned to port number 2 can be redistributed to other ports. Ports with fewer assigned buckets can be selected before selecting ports with higher numbers of assigned buckets. For example, port 5 and then port 7 can be selected as they have 10 assigned buckets. After assigning bucket 2 to port 5 and bucket 8 to port 7, 11 buckets are assigned to ports 5 and 7. Buckets 14, 20, 26 . . . 63 can be assigned to ports 0, 1, 3 . . . 7 to distribute buckets to ports.

TABLE 4

| | | | | | | |
|---|---|---|---|---|---|---|
| 0  | 0 | 1 | <u>5</u> | 3 | 5 | 7 |
| 6  | 0 | 1 | <u>7</u> | 3 | 5 | 7 |
| 12 | 0 | 1 | <u>0</u> | 3 | 5 | 7 |
| 18 | 0 | 1 | <u>1</u> | 3 | 5 | 7 |
| 24 | 0 | 1 | <u>3</u> | 3 | 5 | 7 |
| 30 | 0 | 1 | <u>5</u> | 3 | 5 | 7 |
| 36 | 0 | 1 | <u>7</u> | 3 | 5 | 7 |
| 42 | 0 | 1 | <u>0</u> | 3 | 5 | 7 |
| 48 | 0 | 1 | <u>1</u> | 3 | 5 | 7 |
| 54 | 0 | 1 | <u>3</u> | 3 | 5 | 7 |
| 60 | 0 | 1 | <u>5</u> | 3 | N/A | N/A |

A resulting distribution of buckets (DV) to ports is as follows.

TABLE 5

| Member | 0 | 1 | 2 | 3 | 5 | 7 |
|---|---|---|---|---|---|---|
| DV | 13 | 13 | 0 | 13 | 13 | 12 |

After port number 2 is deallocated, a situation can arise where a port number 7 is congested, inactive, or disabled. Buckets assigned to port number 7 can be redistributed to other available ports, namely ports 0, 1, 3, and 5. For example, any bucket assigned to port number 7 can be reassigned to other ports. For example, buckets 5, 8, 11, 17, and 23, and so forth can be assigned to port 0, port 1, port 3, and port 5, and cycle through again, until bucket 59 is assigned to port 1.

TABLE 6

| | | | | | | |
|---|---|---|---|---|---|---|
| 0  | 0 | 1 | 5 | 3 | 5 | <u>0</u> |
| 6  | 0 | 1 | <u>3</u> | 3 | 5 | <u>1</u> |
| 12 | 0 | 1 | <u>0</u> | 3 | 5 | <u>3</u> |
| 18 | 0 | 1 | 1 | 3 | 5 | <u>5</u> |
| 24 | 0 | 1 | 3 | 3 | 5 | <u>0</u> |
| 30 | 0 | 1 | 5 | 3 | 5 | <u>1</u> |
| 36 | 0 | 1 | <u>5</u> | 3 | 5 | <u>3</u> |
| 42 | 0 | 1 | <u>0</u> | 3 | 5 | <u>5</u> |
| 48 | 0 | 1 | 1 | 3 | 5 | <u>0</u> |
| 54 | 0 | 1 | 3 | 3 | 5 | <u>1</u> |
| 60 | 0 | 1 | 5 | 3 | N/A | N/A |

A resulting distribution of buckets (DV) to ports is as shown in Table 7.

TABLE 7

| Member | 0 | 1 | 2 | 3 | 5 | 7 |
|---|---|---|---|---|---|---|
| DV | 16 | 16 | 0 | 16 | 16 | 0 |

A situation can arise where port 2 is active again so that 5 ports are available to assign to buckets. The network interface device and/or driver can attempt to reduce a number of changes of bucket to port assignment. Changes to bucket to port assignment could cause packet drop. A determination can be made as to a number of buckets to a port. In some examples, 13 or 12 buckets can be assigned to a particular port. Accordingly, a representation of overage or underage of number of buckets to port can be as indicated in Table 8 below.

TABLE 8

| Member | 0 | 1 | 2 | 3 | 5 | 7 |
|---|---|---|---|---|---|---|
| $\Delta_i$ | 3 too many | 3 too many | −13 (too few) | 3 too many | 4 too many | 0 |

An association of buckets to ports can be as shown in Table 9.

TABLE 9

| | | | | | | |
|---|---|---|---|---|---|---|
| 0  | 0 | 1 | <u>2</u> | 3 | 5 | 0 |
| 6  | 0 | 1 | <u>2</u> | 3 | 5 | 1 |
| 12 | 0 | 1 | <u>2</u> | 3 | 5 | 3 |
| 18 | 0 | 1 | <u>2</u> | 3 | 5 | 5 |
| 24 | 0 | 1 | <u>2</u> | 3 | 5 | 0 |
| 30 | 0 | 1 | <u>2</u> | 3 | 5 | 1 |
| 36 | 0 | 1 | <u>2</u> | 3 | 5 | 3 |
| 42 | 0 | 1 | <u>2</u> | 3 | 5 | 5 |
| 48 | 0 | 1 | <u>2</u> | 3 | 5 | 0 |
| 54 | 0 | 1 | <u>2</u> | 3 | 5 | 1 |
| 60 | 0 | 1 | <u>2</u> | 3 | N/A | N/A |

A representation of overage or underage of number of buckets to port can be as indicated in the Table 10 below.

TABLE 10

| Member | 0 | 1 | 2 | 3 | 5 | 7 |
|---|---|---|---|---|---|---|
| $\Delta_i$ | 1 | 1 | −2 | 0 | 0 | 0 |

As ports 0 and 1 each have an overage of 1, after reassignment of buckets to ports can be as shown in Table 11.

TABLE 11

| 0 | 0 | 1 | 2 | 3 | 5 | 2 |
|---|---|---|---|---|---|---|
| 6 | 0 | 1 | 2 | 3 | 5 | 2 |
| 12 | 0 | 1 | 2 | 3 | 5 | 3 |
| 18 | 0 | 1 | 2 | 3 | 5 | 5 |
| 24 | 0 | 1 | 2 | 3 | 5 | 0 |
| 30 | 0 | 1 | 2 | 3 | 5 | 1 |
| 36 | 0 | 1 | 2 | 3 | 5 | 3 |
| 42 | 0 | 1 | 2 | 3 | 5 | 5 |
| 48 | 0 | 1 | 2 | 3 | 5 | 0 |
| 54 | 0 | 1 | 2 | 3 | 5 | 1 |
| 60 | 0 | 1 | 2 | 3 | N/A | N/A |

A representation of overage or underage of number of buckets to port can be as indicated in the Table 12 below.

TABLE 12

| Member | 0 | 1 | 2 | 3 | 5 | 7 |
|---|---|---|---|---|---|---|
| $\Delta_i$ | 0 | 0 | 0 | 0 | 0 | 0 |

A resulting distribution of buckets (DV) to ports is as shown in Table 13.

TABLE 13

| Member | 0 | 1 | 2 | 3 | 5 | 7 |
|---|---|---|---|---|---|---|
| DV | 13 | 13 | 13 | 13 | 12 | 0 |

Figure 5:
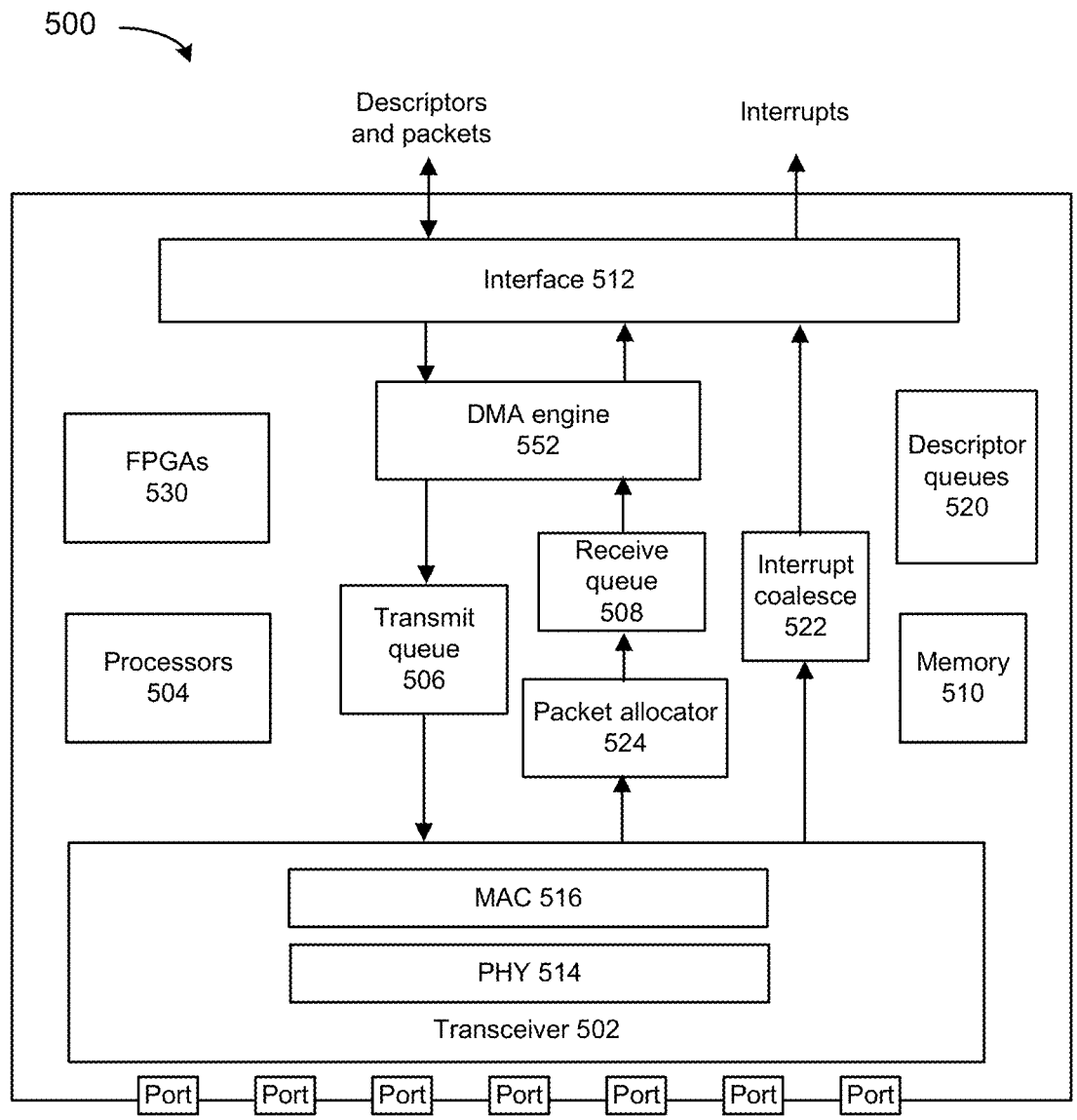
FIG. 5 depicts a network interface that can use embodiments or be used by embodiments.

FIG. 5 depicts a network interface that can use embodiments or be used by embodiments. Various processor resources in the network interface can detect egress port overrun or underrun and potentially cause re-distribution of packet hash buckets to one or more egress ports as described herein. In some examples, network interface 500 can be implemented as a network interface controller, network interface card, a host fabric interface (HFI), or host bus adapter (HBA), and such examples can be interchangeable. Network interface 500 can be coupled to one or more servers using a bus, PCIe, CXL, or DDR. Network interface 500 may be embodied as part of a system-on-a-chip (SoC) that includes one or more processors, or included on a multichip package that also contains one or more processors.

Some examples of network device 500 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 500 can include transceiver 502, processors 504, transmit queue 506, receive queue 508, memory 510, and bus interface 512, and DMA engine 552. Transceiver 502 can be capable of receiving and transmitting packets in conformance with the applicable protocols such as Ethernet as described in IEEE 802.3, although other protocols may be used. Transceiver 502 can receive and transmit packets from and to a network via a network medium (not depicted). Transceiver 502 can include PHY circuitry 514 and media access control (MAC) circuitry 516. PHY circuitry 514 can include encoding and decoding circuitry (not shown) to encode and decode data packets according to applicable physical layer specifications or standards. MAC circuitry 516 can be configured to perform MAC address filtering on received packets, process MAC headers of received packets by verifying data integrity, remove preambles and padding, and provide packet content for processing by higher layers. MAC circuitry 516 can be configured to assemble data to be transmitted into packets, that include destination and source addresses along with network control information and error detection hash values.

Processors 504 can be any a combination of a: processor, core, graphics processing unit (GPU), field programmable gate array (FPGA), application specific integrated circuit (ASIC), or other programmable hardware device that allow programming of network interface 500. For example, a "smart network interface" or SmartNIC can provide packet processing capabilities in the network interface using processors 504.

Processors 504 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can count packet transmission rates per egress port and provide a message to a device driver of overrun or underrun situations. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 524 can provide distribution of received packets for processing by multiple CPUs or cores using timeslot allocation described herein or RSS. When packet allocator 524 uses RSS, packet allocator 524 can calculate a hash or make another determination based on contents of a received packet to determine which CPU or core is to process a packet.

Interrupt coalesce 522 can perform interrupt moderation whereby network interface interrupt coalesce 522 waits for multiple packets to arrive, or for a time-out to expire, before generating an interrupt to host system to process received packet(s). Receive Segment Coalescing (RSC) can be performed by network interface 500 whereby portions of incoming packets are combined into segments of a packet. Network interface 500 provides this coalesced packet to an application.

Direct memory access (DMA) engine 552 can copy a packet header, packet payload, and/or descriptor directly from host memory to the network interface or vice versa, instead of copying the packet to an intermediate buffer at the host and then using another copy operation from the intermediate buffer to the destination buffer.

Memory 510 can be any type of volatile or non-volatile memory device and can store any queue or instructions used to program network interface 500. Transmit queue 506 can include data or references to data for transmission by network interface. Receive queue 508 can include data or references to data that was received by network interface from a network. Descriptor queues 520 can include descriptors that reference data or packets in transmit queue 506 or receive queue 508. Bus interface 512 can provide an interface with host device (not depicted). For example, bus interface 512 can be compatible with PCI, PCI Express, PCI-x, Serial ATA, and/or USB compatible interface (although other interconnection standards may be used).

Figure 6:
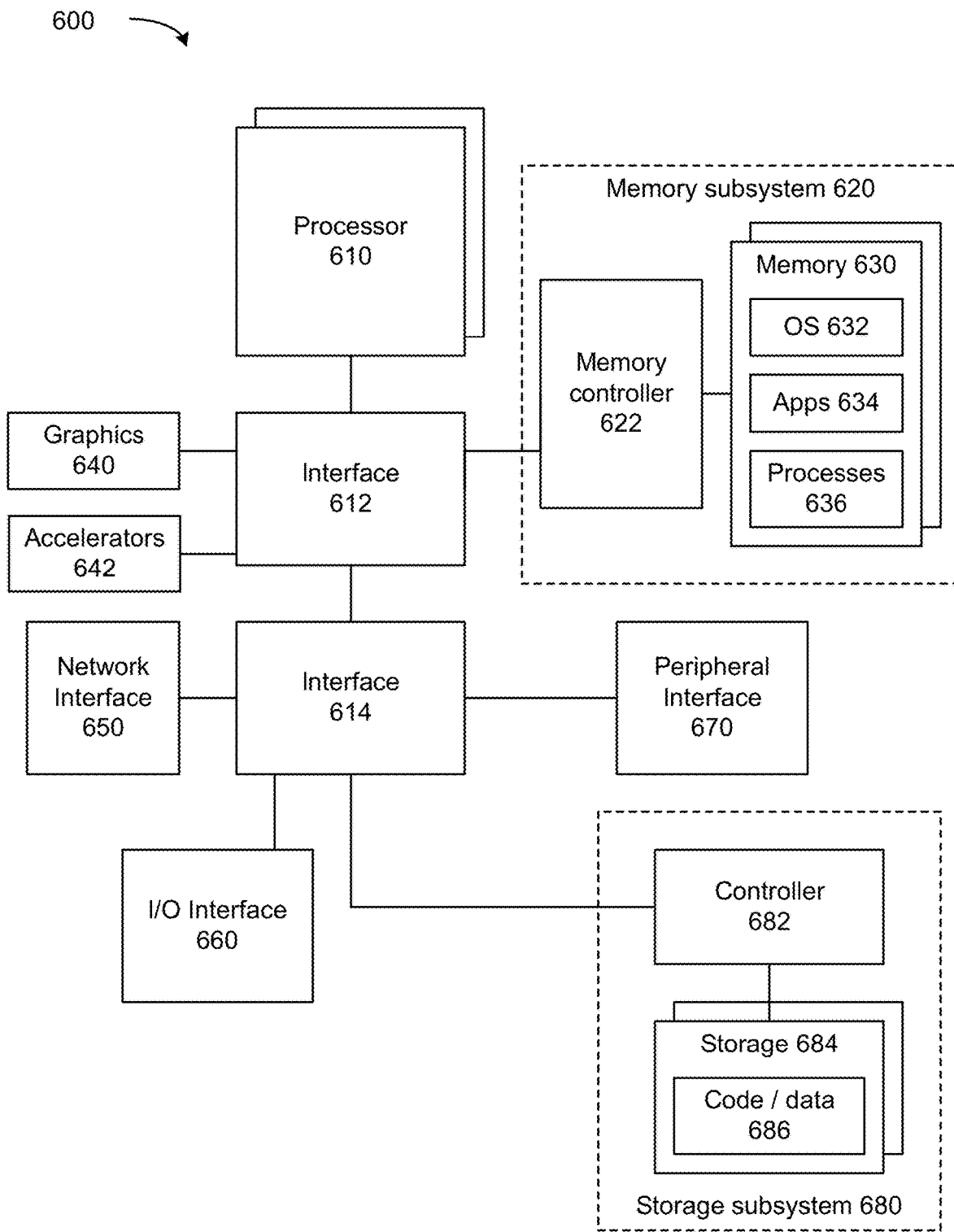
FIG. 6 depicts an example computing system.

FIG. 6 depicts an example computing system. Various embodiments can use components of system 600 (e.g., processor 610, network interface 650, and so forth) to perform detection and reallocation of hash buckets of packet header field(s) to egress ports. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function or programmable offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 642 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

In some examples, OS 632 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can cause offloading of detection of egress port overrun or underrun conditions and reporting either or both conditions to the driver or other software to reallocate hash-based buckets to egress ports.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various examples of network interface 650 configure one or more network devices and/or nodes to pre-configure another network device and/or node to perform telemetry collection associated with service execution and copying of telemetry.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a non-volatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after"

can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z.'"

Illustrative examples of the devices, systems, and methods disclosed herein are provided below. An embodiment of the devices, systems, and methods may include one or more, and combination of, the examples described below.

Example 1 includes one or more examples and includes an apparatus comprising: a network interface device comprising: packet processing circuitry to detect usage of an egress port and report the usage of the egress port to a network interface device driver to cause reallocation of hash-based packet buckets to at least one egress port to provide an allocation of hash-based packet buckets to multiple active egress ports of the network interface device with retention of bucket-to-egress port mappings except for re-allocations of one or more buckets to one or more active egress ports.

Example 2 includes one or more examples, wherein the usage of the egress port is based on a count of hash buckets assigned to packets to be transmitted from the egress port.

Example 3 includes one or more examples, wherein the usage of the egress port is based on a number of bytes of packets enqueued to be transmitted from the egress port.

Example 4 includes one or more examples, wherein the network interface device comprises: circuitry to apply a hash to portions of a packet header to determine a bucket for a packet and the egress port based on a first allocation of buckets-to-egress ports.

Example 5 includes one or more examples, wherein the circuitry is to receive a second allocation of buckets-to-egress ports to replace the first allocation of buckets-to-egress ports.

Example 6 includes one or more examples, wherein the packet processing circuitry is to detect and report head of line blocking at an egress port.

Example 7 includes one or more examples, wherein the network interface device comprises one or more of: network interface controller (NIC), SmartNIC, router, switch, forwarding element, infrastructure processing unit (IPU), or data processing unit (DPU).

Example 8 includes one or more examples and includes a server communicatively coupled to the network interface device, wherein the server comprises at least one processor that is to execute a driver for the network interface device and wherein: the driver is to offload detection of usage of the egress port to the network interface device, the driver is to reallocate hash-based packet buckets to at least one egress port to provide an approximately even allocation of hash-based packet buckets to multiple egress ports of the network interface device, and the driver is to provide an indication of the reallocated hash-based packet buckets to the network interface device to apply for packet-to-port allocations.

Example 9 includes one or more examples, wherein: the driver is to reallocate hash-based packet buckets to at least one egress port by one or more of: change of hash function, change of fields input to the hash function, or performance of round robin selection of packets from transmit queues to select a packet to transmit.

Example 10 includes one or more examples and includes a computer-readable medium comprising instructions stored thereon, that if executed by one or more processors, cause the one or more processors to: perform a driver to configure a network interface device, when operational, to detect usage of an egress port and report the usage of the egress port to the driver to cause reallocation of hash-based packet buckets to at least one egress port to provide an allocation of hash-based packet buckets to multiple active egress ports of the network interface device with retention of bucket-to-egress port mappings except for re-allocations of one or more buckets to one or more active egress ports.

Example 11 includes one or more examples, wherein the usage of the egress port is based on a count of hash buckets assigned to packets to be transmitted from the egress port or a number of bytes of packets enqueued to be transmitted from the egress port.

Example 12 includes one or more examples, wherein the driver is to configure the network interface device, when operational, to detect and report head of line blocking at an egress port.

Example 13 includes one or more examples, and includes instructions stored thereon, that if executed by one or more processors, cause the one or more processors to: execute the driver to reallocate hash-based packet buckets to at least one egress port to reduce imbalances of allocations of hash-based packet buckets to multiple egress ports of the network interface device and execute the driver to provide the reallocation of hash-based packet buckets to at least one egress port to the network interface device for the network interface device to apply for packet-to-port allocations.

Example 14 includes one or more examples, and includes instructions stored thereon, that if executed by one or more processors, cause the one or more processors to: execute the driver to reallocate hash-based packet buckets to at least one egress port by one or more of: change of hash function, change of fields input to the hash function, or performance of round robin selection of packets from transmit queues to select a packet to transmit.

Example 15 includes one or more examples, and includes a method comprising: at a network interface device, detecting usage of an egress port and reporting the usage of the egress port to a network interface device driver to cause reallocation of hash-based packet buckets to at least one egress port to provide an allocation of hash-based packet buckets to multiple active egress ports of the network interface device with retention of bucket-to-egress port mappings except for re-allocations of one or more buckets to one or more active egress ports.

Example 16 includes one or more examples, wherein the usage of the egress port is based on a count of hash buckets assigned to packets to be transmitted from the egress port or a number of bytes of packets enqueued to be transmitted from the egress port.

Example 17 includes one or more examples, and includes at the network interface device, detecting and reporting head of line blocking at an egress port.

Example 18 includes one or more examples, and includes reallocating, at the network interface device driver, hash-based packet buckets to at least one egress port to reduce imbalances of allocations of hash-based packet buckets to multiple egress ports of the network interface device and providing, from the network interface device driver, the reallocation of hash-based packet buckets to at least one egress port to the network interface device for the network interface device to apply for packet-to-port allocations.

Example 19 includes one or more examples, wherein: reallocation of hash-based packet buckets to at least one egress port is based one or more of: change of hash function, change of fields input to the hash function, or performance of round robin selection of packets from transmit queues to select a packet to transmit.

Example 20 includes one or more examples, wherein the network interface device comprises one or more of: network interface controller (NIC), SmartNIC, router, switch, forwarding element, infrastructure processing unit (IPU), or data processing unit (DPU).

The invention claimed is:

1. An apparatus comprising:
a network interface device comprising:
packet processing circuitry to detect overflow of an active egress port and to cause reallocation of hash-based packet buckets from the overflowed active egress port to at least one other active egress port with retention of bucket-to-egress port mappings for the at least one other active egress port, detect non-overflow of the active egress port, and based on detected non-overflow of the active egress port, receive reallocation of hash-based packet buckets to utilize the active egress port.

2. The apparatus of claim 1, wherein the overflow of the active egress port is based on a count of hash buckets assigned to packets to be transmitted from the active egress port.

3. The apparatus of claim 1, wherein the overflow of the active egress port is based on a number of bytes of packets enqueued to be transmitted from the active egress port.

4. The apparatus of claim 1, wherein the network interface device comprises:
circuitry to apply a hash to portions of a packet header to determine a bucket for a packet and an egress port for the determined bucket is based on a first allocation of buckets-to-egress ports.

5. The apparatus of claim 4, wherein the circuitry is to receive a second allocation of buckets-to-egress ports to replace the first allocation of buckets-to-egress ports.

6. The apparatus of claim 1, wherein the packet processing circuitry is to detect and report head of line blocking at the active egress port.

7. The apparatus of claim 1, wherein the network interface device comprises one or more of: network interface controller (NIC), SmartNIC, router, switch, forwarding element, infrastructure processing unit (IPU), or data processing unit (DPU).

8. The apparatus of claim 1, comprising a server communicatively coupled to the network interface device, wherein the server comprises at least one processor that is to execute a driver for the network interface device and wherein:
the driver is to offload detection of overflow of the active egress port to the network interface device,
the driver is to reallocate hash-based packet buckets to at least one non-congested active egress port to provide an approximately even allocation of hash-based packet buckets to the at least one non-congested active egress port of the network interface device, and
the driver is to provide an indication of the reallocated hash-based packet buckets to the network interface device to apply for packet-to-port allocations.

9. The apparatus of claim 8, wherein:
the driver is to reallocate hash-based packet buckets to the at least one other active egress port by one or more of: change of hash function, change of fields input to the hash function, or performance of round robin selection of packets from transmit queues to select a packet to transmit.

10. The apparatus of claim 1, wherein the at least one other active egress port are non-congested.

11. At least one non-transitory computer-readable medium comprising instructions stored thereon, that if executed by one or more processors, cause the one or more processors to:
perform a driver to configure a network interface device, when operational, to detect overflow of an active egress port and report the overflow of the egress port to the driver, wherein:
based on reporting of overflow, the driver is to cause reallocate hash-based packet buckets from the overflowed active egress port to at least one other active egress port with retention of bucket-to-egress port mappings for the at least one other active egress port and
based on reporting of non-overflow of the active egress port, the driver is to cause reallocation of hash-based packet buckets to utilize the non-overflown active egress port.

12. The computer-readable medium of claim 11, wherein the overflow of the active egress port is based on a count of hash buckets assigned to packets to be transmitted from the active egress port or a number of bytes of packets enqueued to be transmitted from the active egress port.

13. The computer-readable medium of claim 11, wherein the driver is to configure the network interface device, when operational, to detect and report head of line blocking at the active egress port.

14. The computer-readable medium of claim 11, comprising instructions stored thereon, that if executed by one or more processors, cause the one or more processors to:
execute the driver to reallocate hash-based packet buckets to at least one non-congested active egress port to reduce imbalances of allocations of hash-based packet buckets to the at least one non-congested active egress port of the network interface device and
provide the reallocation of hash-based packet buckets to at least one egress port to the network interface device for the network interface device to apply for packet-to-port allocations.

15. The computer-readable medium of claim 14, comprising instructions stored thereon, that if executed by one or more processors, cause the one or more processors to:
execute the driver to reallocate hash-based packet buckets to the at least one other active egress port by one or more of: change of hash function, change of fields input to the hash function, or performance of round robin selection of packets from transmit queues to select a packet to transmit.

16. A method comprising:
at a network interface device:
detecting overflow of an active egress port and reporting the overflow of the active egress port to a network interface device driver to cause reallocation of hash-based packet buckets to at least one other active egress port with retention of bucket-to-egress port mappings for the at least one other active egress port,
detecting non-overflow of the active egress port, and
performing reallocation of hash-based packet buckets to utilize the non-overflown active egress port.

17. The method of claim 16, wherein the overflow of the active egress port is based on a count of hash buckets assigned to packets to be transmitted from the active egress port or a number of bytes of packets enqueued to be transmitted from the active egress port.

18. The method of claim 16, comprising:
at the network interface device, detecting and reporting head of line blocking at the active egress port.

19. The method of claim 16, comprising:
reallocating, at the network interface device driver, hash-based packet buckets to at least one non-congested active egress port to reduce imbalances of allocations of hash-based packet buckets to the at least one non-congested active egress port of the network interface device and
providing, from the network interface device driver, the reallocation of hash-based packet buckets to at least one non-congested active egress port to the network interface device for the network interface device to apply for packet-to-port allocations.

20. The method of claim 16, wherein:

reallocation of hash-based packet buckets to the at least one other active egress port is based one or more of: change of hash function, change of fields input to the hash function, or performance of round robin selection of packets from transmit queues to select a packet to transmit.

21. The method of claim 16, wherein the network interface device comprises one or more of: network interface controller (NIC), SmartNIC, router, switch, forwarding element, infrastructure processing unit (IPU), or data processing unit (DPU).

* * * * *